United States Patent [19]

Valiga

[11] 4,166,709

[45] Sep. 4, 1979

[54] METHOD FOR VAULTING HAZARDOUS CHEMICAL WASTE MATERIALS

[75] Inventor: Richard E. Valiga, Centre Square, Pa.

[73] Assignee: Stabatrol Corporation, Norristown, Pa.

[21] Appl. No.: 930,705

[22] Filed: Aug. 3, 1978

[51] Int. Cl.² ............................................. E02D 3/12
[52] U.S. Cl. ....................................... 405/128; 405/55
[58] Field of Search .................... 405/53, 55, 57, 128, 405/129

[56] References Cited

U.S. PATENT DOCUMENTS

| 3,466,873 | 9/1969 | Present | 405/128 |
| 3,586,624 | 6/1971 | Larson | 405/129 X |

FOREIGN PATENT DOCUMENTS

| 2152172 | 4/1973 | Fed. Rep. of Germany | 405/128 |
| 2430371 | 1/1976 | Fed. Rep. of Germany | 405/128 |

Primary Examiner—Thomas F. Callaghan
Assistant Examiner—David H. Corbin

[57] ABSTRACT

Hazardous chemical waste materials can be vaulted for permanent disposal by encapsulation in a water-impermeable film and a soil cement.

3 Claims, 8 Drawing Figures

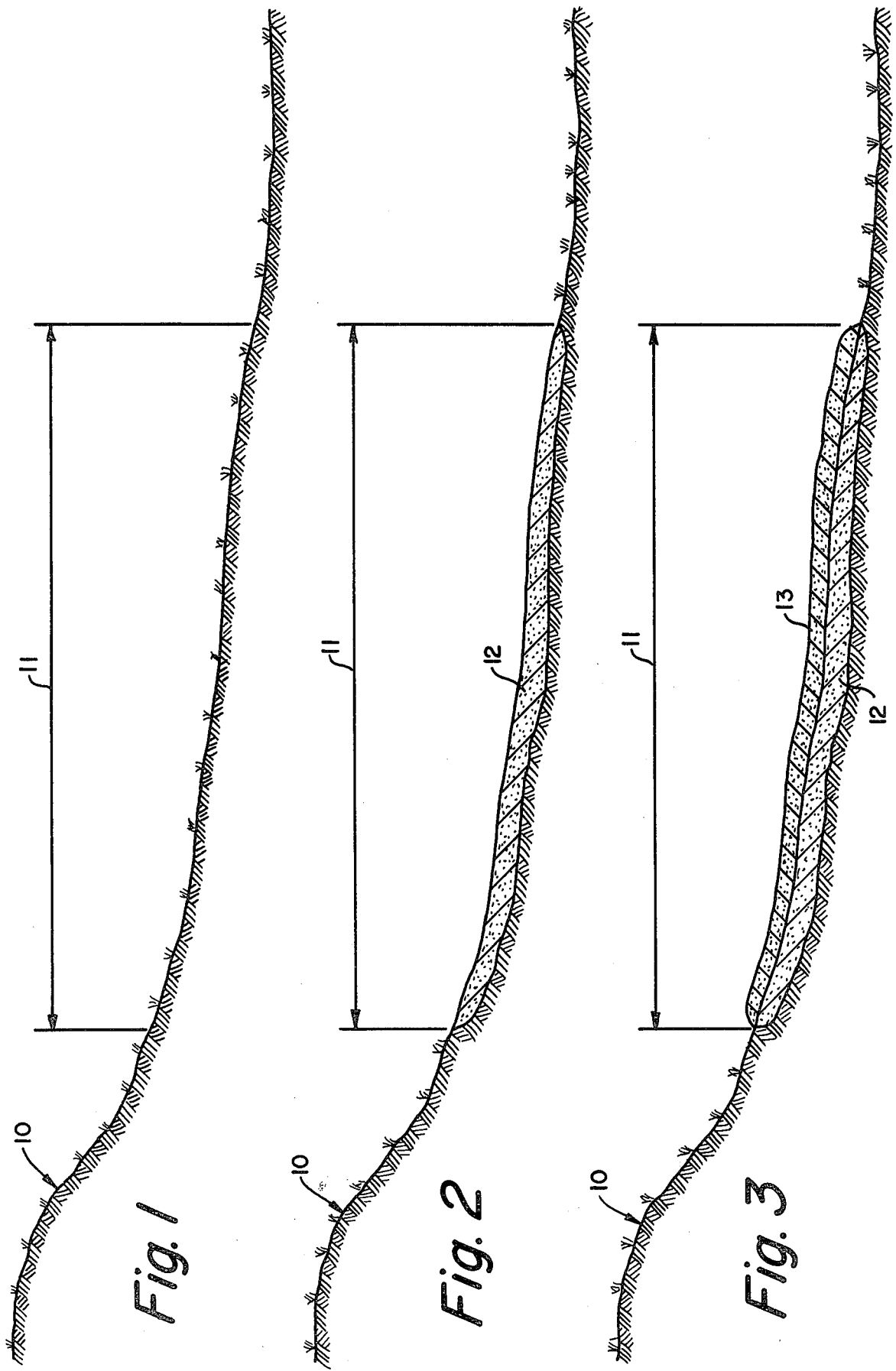

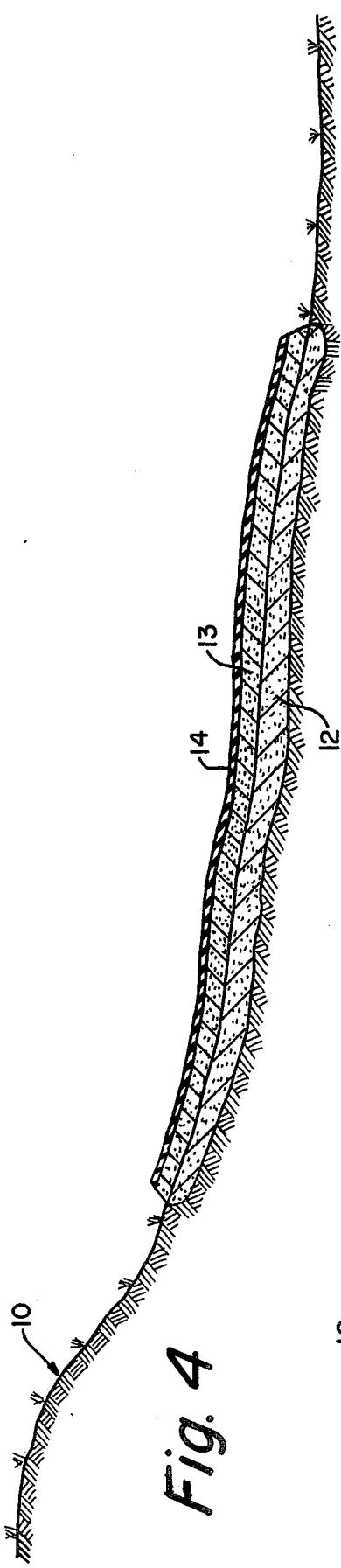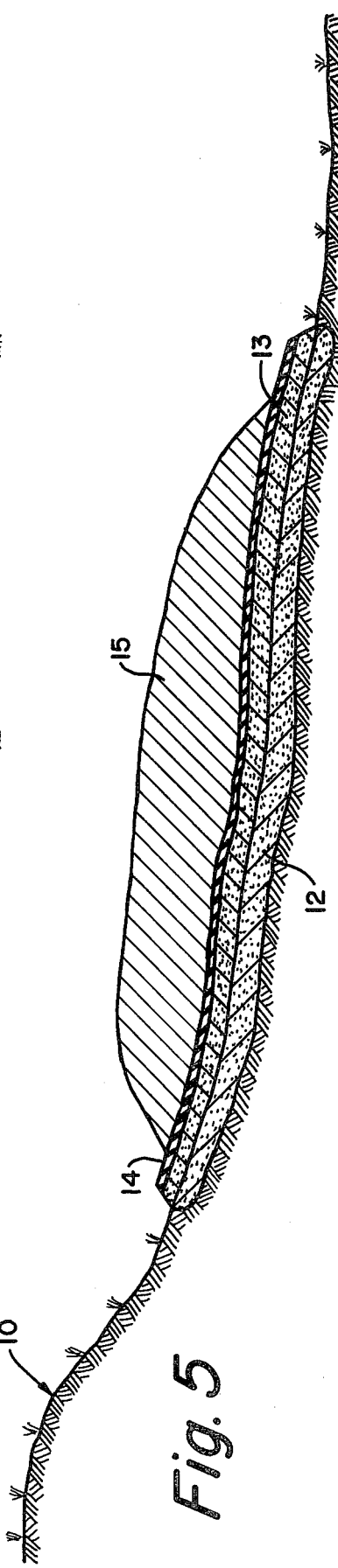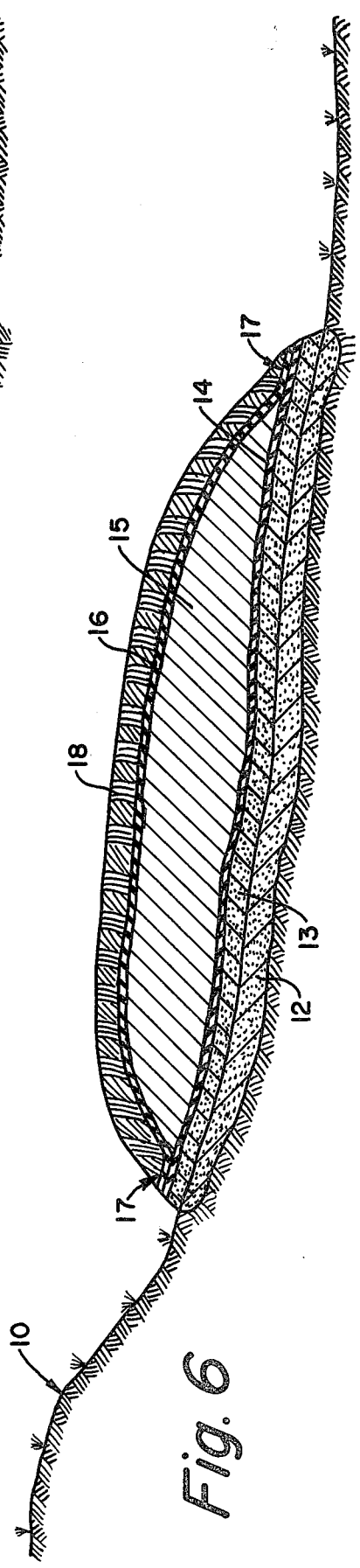

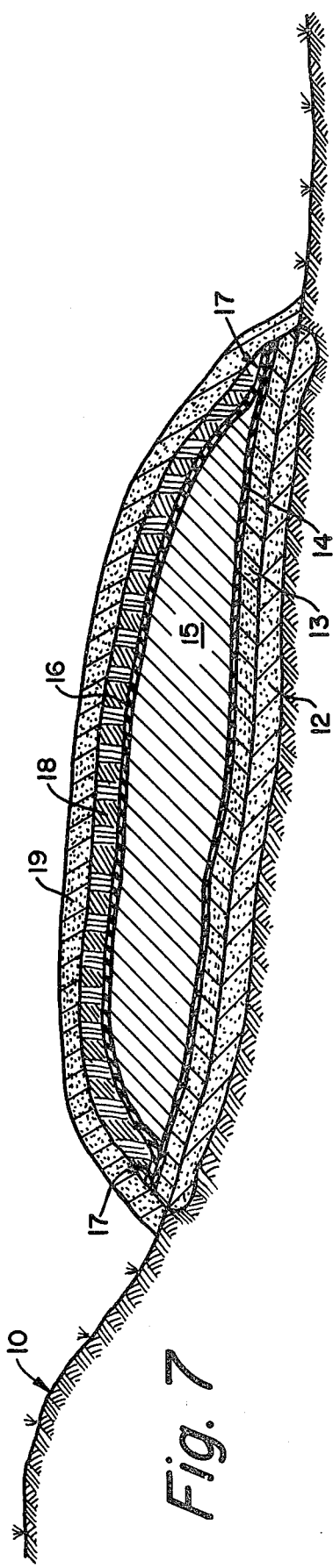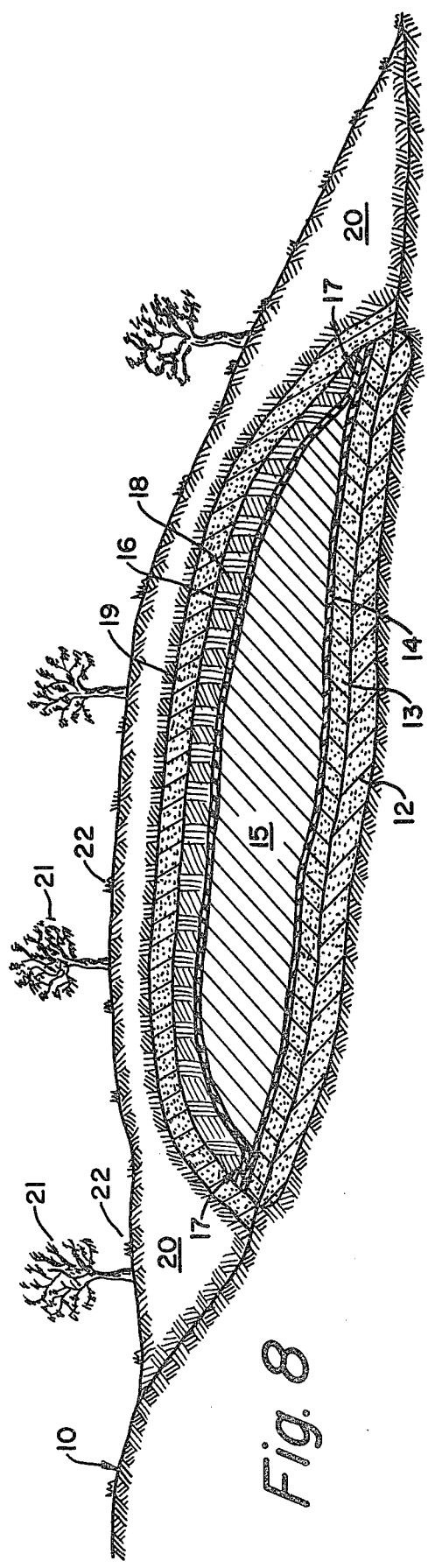

METHOD FOR VAULTING HAZARDOUS CHEMICAL WASTE MATERIALS

BACKGROUND OF THE INVENTION

1. Field of the Invention

This invention relates to vaulting hazardous chemical waste materials for waste disposal.

2. Description of the Prior Art

Heretofore hazardous chemical waste materials have been disposed of by constructing concrete vaults in which the waste materials have been deposited. In other instances the waste materials have been contained in metal drums which are themselves embedded in concrete. These methods are expensive and cumbersome.

In some instances hazardous chemical waste materials have been deposited in ordinary landfills which have facilities for collecting and treating the aqueous leachate to eliminate the hazardous chemical ingredients.

Environmental protection regulations preclude the mere dumping of hazardous chemical waste materials into the earth where the natural flow of water might permit leaching of the hazardous chemical ingredients into natural water supplies.

SUMMARY OF THE INVENTION

The principal object of this invention is to provide an economical method for vaulting hazardous chemical waste materials which satisfies environmental protection regulations and which avoids the expense of previously practiced methods.

According to the present invention, the hazardous chemical waste materials are encapsulated sequentially in a water-impermeable film and in turn in a suitable soil cement composition.

According to the method, a vault area is selected wherein the natural earth is compatible with portland cement for preparation of a product known as soil cement. As a first step, portland cement is mixed with the existing soil in the vault area to formulate a soil cement. The soil cement thereafter is compacted to produce a soil cement coating over the entire vault area having a thickness preferably from about 3 inches to about 18 inches. Optimally, the first soil cement layer has a thickness of about 6 inches. After the first soil cement layer has suitably compacted, additional soil is brought to the vault area and combined with additional portland cement to produce a second soil cement layer on top of the first soil cement layer. The second soil cement layer similarly has a thickness from about 3 inches to about 18 inches, optimally about 6 inches. The two soil cement layers cover the entire vault area.

Thereafter, a first water-impermeable film is applied to the top of the second soil cement layer. Preferably the water-impermeable film is polyethylene or polypropylene sheeting although other water-impermeable film such as bituminous sprayed-on coatings may be employed.

After the base has been prepared for the vault area, the hazardous chemical waste material is delivered and deposited directly on top of the first water-impermeable film. After all of the hazardous chemical waste material has been deposited, the layer of hazardous chemical waste material is compacted and thereafter a second water-impermeable film is applied over the top of the compacted waste material. The edges of the second water-impermeable film and the edges of the first water-impermeable film are sealed. Where a polyethylene or polypropylene film is employed, suitable adhesives may be utilized to create an effective seal. Where bituminous sprays are employed to generate a water-impermeable film, the two films can be joined around the perimeter of the compacted waste materials.

After the second water-impermeable film has been positioned, a third layer of soil cement is applied over the second water-impermeable film. Preferably this third soil cement layer has a thickness from about 3 to 18 inches, optimally about 6 inches. A fourth soil cement layer on top of the third layer is preferred. Thereafter, suitable filler materials are deposited on top of the third (and fourth, if provided) soil cement layer and graded to conform with the geography in the area immediately surrounding the vault area. The filler materials preferably are locally available earth materials. However, non-hazardous waste materials such as municipal garbage may be employed in whole or in part as the filler materials. After the filler materials have been applied to conform with the surrounding geography, suitable vegetation such as trees, grasses, shrubbery can be planted on top of the earth materials.

The resulting structure provides a permanent vaulting facility for hazardous chemical waste materials which is acceptable under environmental protection regulations.

BRIEF DESCRIPTION OF THE DRAWINGS

FIGS. 1 through 8 illustrate a topographical cross-section showing the various stages of assembling the vault of the present invention.

DESCRIPTION OF THE PREFERRED EMBODIMENT(S)

Hazardous chemical waste materials are usually residues of chemical plants or manufacturing or mining activities. They may contain heavy metals (e.g., chromium, arsenic) or persistent organics (e.g., halogenated aromatics) or concentrated materials which can be easily dissolved (e.g., alkali metal salts). Such wastes usually are neutralized before disposal. Some wastes are dried to a "salt cake" which can be discarded in bulk. Other wastes remain moist and may be stored in drums in which the waste is discarded. The hazardous chemical waste materials must be discarded with great care to preclude leaching of the hazardous chemical ingredients into the environment.

For the purpose of this description, the hazardous chemical waste materials will be hereinafter identified as a "salt cake" to facilitate explanation.

A typical salt cake is the waste product of a chemical refinery operation. One specific salt cake contains 99% sodium sulfate and 0.3 to 0.5% chromium and the balance unidentified solids. The chromium normally is in the form of $Na_2CrO_7.2H_2O$. Another typical salt cake contains approximately 1% arsenic and the remaining 99% is a mixture of 2 parts sodium sulfate and 3 parts sodium chloride.

These materials can be successfully vaulted for waste disposal according to the present method.

Soil cement is a term applied to a product which is formed by employing the natural soil of a particular geographic location in combination with portland cement. The soil serves as an inert aggregate in the resulting portland cement composition.

The preferred soil cement for the present invention contains from about 3 to 10 parts by weight portland cement for 100 parts by weight of locally available earth materials. The portland cement and earth materials can be mixed by means of an ordinary disk-harrow. The resulting soil cement should be inert with respect to the hazardous chemical waste materials and also should resist attack from the hazardous chemical waste materials. The art of making soil cement is well developed. Many descriptive publications are available from the Portland Cement Association. The earth materials include native soils (preferably low in organic content), gravel, sand, crushed materials, cinders, slag, shale. In general, the soil cement will achieve about 90% of its ultimate strength in less than 30 days.

Referring to FIG. 1, a topographic area is shown in cross-section having a terrain surface 10. The topography is prepared by establishing a vault area indicated by the arrow 11 in FIGS. 1, 2 and 3. The selected vault area 11 may be on a natural terrain; or may be pre-graded natural terrain; or may be an existing landfill wherein the surface has been compacted to acceptable strength. The vault area is covered with a first layer 12 of soil cement as shown in FIG. 2. The first layer is from 3 to 18 inches thick, optimally about 6 inches thick. The soil cement is produced by combining portland cement with the existing soil material and compacting the resulting mixture with a sheep foot roller.

After the layer 12 has been compacted, a second layer 13 of soil cement is applied on top of the first layer 12 as shown in FIG. 3. The second layer 13 has a thickness from 3 to 18 inches, optimally about 6 inches.

A water-impermeable film 14 is applied on top of the second soil cement layer 13 as shown in FIG. 4. The film 14 may be polyethylene, polypropylene, PVC or a sprayed bituminous film.

As shown in FIG. 5, the salt cake 15 is applied to the top of the film 14 and is suitably compacted. Optimally, the salt cake is piled to a height of about six feet if deposited in bulk. During the delivery of the salt cake 15, it is important to protect the material from exposure to wind losses and atmospheric precipitation. This can be conveniently done by covering the material with canvas tarpaulins or plastic films.

If the salt cake is to be vaulted in drums, the drums are assembled as a single layer of upright cylinders. Each layer of drums is covered with about one foot of locally available earth materials before another layer of drums is stacked on top. Many layers of assembled drums can be vaulted in this manner.

After the salt cake 15 has been compacted, a second film 16 is applied on top of the compacted salt cake. The edges of the film 16 are sealed to the edges of the film 14 around the perimeter as indicated by the arrows 17, FIG. 6. Where the films 14, 16 are polyethylene or polypropylene, a suitable adhesive may be employed. A 6 mil polyethylene film is a preferred material for the films 14, 16.

A layer 18 of granular locally available earth materials is applied on top of the second film to a depth of about 12 inches to protect the film 16 from tearing.

A third layer of soil cement 19 is applied on top of the second film 16 as shown in FIG. 7. The thickness of the third layer 19 is from 3 to 18 inches, optimally about 12 inches.

Preferably, the third layer 19 is formed in two separate activities—i.e., an initial layer of soil cement is applied and compacted. Thereafter a final layer of soil cement is applied on top of the initial layer. The two layers are identified herein as the third layer which has a total thickness of about 12 inches.

The perimeter of the third layer 19 should be bonded to the perimeter of the second layer 13 to provide a secure seal for the vault.

The vault is essentially complete as shown in FIG. 7. Thereafter a supply of suitable filler materials 20 is applied on top of the third soil cement layer 19. The filler materials are contoured to conform with the geography of the surrounding terrain 10. Preferably the slopes of the filler materials 20 should be less than 15%.

Thereafter, as shown schematically in FIG. 8, suitable vegetation is planted on top of the filler materials 20, for example, trees 21, grass 22.

EXAMPLE

A vaulting assembly for 2000 tons of a salt cake employs a vault area slightly greater than 40 feet by 100 feet in area. A total of one foot of the soil cement is provided in two layers. The soil cement has a permeability less than $10^{-7}$ cm/sec and has an unconfined compressive strength of 20–25 tons/square foot. A polyethylene film, 6 mils thick, 40 feet wide by 100 feet long, is commercially available. That film is applied on top of the soil cement base layer. The salt cake is deposited in bulk within the 40 feet by 100 feet vault to a depth of 6 feet. The deposited salt cake is compacted by means of a bulldozer. A second sheet of polyethylene plastic film 40 feet by 100 feet is spread across the compacted salt cake and the two plastic films are sealed by means of watertight joint seal tape and glue.

A one-foot thick layer of finely divided earth materials is applied on top of the second film to protect the film from tearing.

A third soil cement layer is applied on top of the second polyethylene plastic sheet. The third soil cement layer consists of two sequentially applied layers of soil cement, each about 6 inches thick. The third layer extends so that its perimeter engages the perimeter of the soil cement base layer. The resulting vault is water-impermeable, non-leaching and structurally durable. Additional covering of earth materials is applied on top of the third soil cement layer, preferably at least 2 feet thick to receive and nurture vegetation. The earth materials are seeded with appropriate vegetation. The described vault will confine 5000 tons of hazardous "salt cake".

The plastic polyethylene sheets prevent water intrusion into the salt cake. When the salt cake is buried more than 2 feet below the surface of the surrounding terrain, high temperatures and moisture losses will not create any deterioration problems.

I claim:

1. A method for vaulting hazardous chemical waste materials which comprises:
    (1) selecting a vault area;
    (2) applying a first soil cement layer over the said vault area;
    (3) applying a second soil cement layer over the said first soil cement layer;
    (4) applying a first water-impermeable film to the top of the said second soil cement layer;
    (5) depositing the said hazardous chemical waste materials on the said first water-impermeable film;
    (6) applying a second water-impermeable film over the compacted hazardous chemical waste materials;
    (7) sealing the edges of the said first and second films;

(8) applying a third soil cement layer over the said second film;

(9) sealing the perimeter of said third layer to the perimeter of said second layer;

(10) covering the said third soil cement layer with filler materials and grading the said filler materials to conform to the terrain surrounding the said vault area.

2. The method of claim 1 wherein the said water-impermeable film is polyethylene film.

3. The method of claim 1 wherein the said first and second soil cement layers together have a total thickness of 9 to 15 inches.

* * * * *